US009246826B2

(12) United States Patent
Henriksson et al.

(10) Patent No.: US 9,246,826 B2
(45) Date of Patent: Jan. 26, 2016

(54) INTEGRATED CIRCUIT ARRANGEMENT FOR BUFFERING SERVICE REQUESTS

(75) Inventors: Tomas Henriksson, Redhill (GB); Martijn Coenen, Redhill (GB); Pieter Van Der Wolf, Redhill (GB); Elisabeth Francisca Maria Steffens, Redhill (GB)

(73) Assignee: Synopsys, Inc., Mountain View, CA (US)

( * ) Notice: Subject to any disclaimer, the term of this patent is extended or adjusted under 35 U.S.C. 154(b) by 863 days.

(21) Appl. No.: 13/508,537

(22) PCT Filed: Nov. 11, 2009

(86) PCT No.: PCT/IB2009/055014
§ 371 (c)(1),
(2), (4) Date: May 7, 2012

(87) PCT Pub. No.: WO2011/058392
PCT Pub. Date: May 19, 2011

(65) Prior Publication Data
US 2012/0226826 A1  Sep. 6, 2012

(51) Int. Cl.
*G06F 15/16* (2006.01)
*H04L 12/851* (2013.01)
*H04L 12/54* (2013.01)
*H04L 12/859* (2013.01)
*H04L 12/861* (2013.01)

(52) U.S. Cl.
CPC ........ *H04L 47/2441* (2013.01); *H04L 12/5693* (2013.01); *H04L 47/2475* (2013.01); *H04L 49/9063* (2013.01)

(58) Field of Classification Search
CPC ............ H04L 12/5693; H04L 47/2475; H04L 47/2441; H04L 49/9063
See application file for complete search history.

(56) References Cited

U.S. PATENT DOCUMENTS

| | | | |
|---|---|---|---|
| 6,430,181 B1 | 8/2002 | Tuckey | |
| 7,043,593 B1 | 5/2006 | Tischler et al. | |

(Continued)

FOREIGN PATENT DOCUMENTS

| | | |
|---|---|---|
| CN | 1369074 A | 9/2002 |
| CN | 1641685 A | 7/2005 |
| EP | 1919154 A1 | 5/2008 |

OTHER PUBLICATIONS

Chinese First Office Action, Chinese Application No. 200980162411.8, Apr. 14, 2014, 23 pages.

(Continued)

*Primary Examiner* — Larry Donaghue
(74) *Attorney, Agent, or Firm* — Fenwick & West LLP

(57) ABSTRACT

The present invention discloses an integrated circuit arrangement (100) comprising a data communication network comprising a plurality of connections (300), a plurality of modules (110) coupled to the data communication network via at least one network interface (120), the network interface comprising a plurality of buffers; a remote service module (150) being coupled to the data communication network via a further network interface (140), wherein each of said modules (1 10) is arranged to provide its network interface (120) with a service request (200) for the remote service module (150), said network interface being arranged to extend said service request with a first identifier (204) for establishing a network connection (300) with a remote service module (150); and a circuit portion (350) comprising a plurality of buffers (142) between the at least one network interface (120) and the remote service module (150) for storing service requests (200) from the plurality of modules (110), said circuit portion comprising decoding logic (144) for selecting one of said buffers (142) by decoding a further identifier (210) embedded in the service request (200).

12 Claims, 2 Drawing Sheets

(56) References Cited

U.S. PATENT DOCUMENTS

| | | | |
|---|---|---|---|
| 2002/0099855 A1 | 7/2002 | Bass et al. | |
| 2005/0154802 A1 | 7/2005 | Kravec et al. | |
| 2007/0186018 A1* | 8/2007 | Radulescu et al. | 710/100 |
| 2008/0232387 A1* | 9/2008 | Rijpkema et al. | 370/420 |
| 2009/0016338 A1* | 1/2009 | Radulescu | 370/389 |
| 2010/0169896 A1* | 7/2010 | Bennebroek et al. | 719/318 |

OTHER PUBLICATIONS

PCT International Search Report and Written Opinion, PCT Application No. PCT/IB2009/055014, Aug. 5, 2010, 14 pages.

Radulescu, A. et al., "An Efficient On-Chip Network Interface Offering Guaranteed Services, Shared-Memory Abstraction, and Flexible Network Configuration," Proceedings of the Design, Automation and Test in Europe Conference and Exhibition (Date'04), IEEE, Feb. 16-20, 2004, pp. 878-883, vol. 2.

Chinese Second Office Action, Chinese Application No. 200980162411.8, Nov. 3, 2014, 23 pages.

Chinese Third Office Action, Chinese Application No. 200980162411.8, May 5, 2015, 8 pages.

European Examination Report, European Application No. 09764053.6, Jun. 5, 2015, 6 pages.

\* cited by examiner

US 9,246,826 B2

INTEGRATED CIRCUIT ARRANGEMENT FOR BUFFERING SERVICE REQUESTS

FIELD OF THE INVENTION

The present invention relates to an integrated circuit (IC) arrangement comprising a data communication network comprising a plurality of connections, a plurality of modules coupled to the data communication network via at least one network interface, the network interface comprising a plurality of buffers and a remote service module being coupled to the data communication network via a further network interface, wherein each of said modules is arranged to provide its network interface with a service request for the remote service module, said service request comprising a first identifier for selecting a buffer of the network interface.

The present invention further relates to a module and a circuit portion for use in such an IC arrangement.

BACKGROUND OF THE INVENTION

Facilitation of data communication between modules of an integrated circuit, e.g. a system on-chip (SoC), or between IC modules in a system-in-package (SiP) poses a difficult design challenge for the designers of such arrangements because the complexity of the modules within the arrangement and the speed at which these modules operate put high demands on both the flexibility and the performance of the data communication part of the arrangement.

In complex arrangements, peer-to-peer connections, e.g. buses, are not suitable because they lack the required flexibility such that an excessive amount of metal would have to be incorporated in the IC arrangement to meet data communication requirements. To this end, the so-called network-on-chip (NoC) paradigm has been developed. A typical NoC comprises a plurality of connections between multiple network interfaces, with the connections being configurable by means of switches in the NoC.

An example of an IC arrangement according to the opening paragraph is disclosed in "An Efficient On-Chip NI Offering Guaranteed Services, Shared Memory Abstraction, and Flexible Network Configuration" by A. Radulescu et al. in IEEE Transactions on Computer-Aided Design of Integrated Circuits and Systems, Vol. 24, No. 1, 2005, pages 4-17. In this arrangement, a service request is communicated from a master module to a slave module through such a NoC. The slave module may comprise a plurality of queues, with the master module providing routing information in the form of a combination of a path identifier and a remote queue identifier to allow the network interface to establish a network connection between the network interface of the master module and the network interface of the slave module. The path identifier and the remote queue identifier both reside as first level identifiers in the same level of an OSI compliant request package. The network interface of the master comprises different queues to provide guaranteed bandwidth and best effort services over the network. The queues in the remote (slave) network interface are used for the same purpose.

A drawback of this approach is that once the service request is stored in one of the remote queues, reordering of the service requests is no longer possible, especially when the queues are implemented as first-in first-out (FIFO) buffers. Such reordering may be useful if the processing of the request by the slave module consumes a relatively large amount of time, which may lead to the network becoming underutilized when the slave module is processing one or more time-consuming service requests. For instance, in case of a slave module being a memory controller, the handling of the memory access requests typically takes much longer than the communication of the access request and the access results over the network, such that network performance optimization by the implementation of guaranteed bandwidth and best effort principles over the network connection is unlikely to yield optimal performance of the IC arrangement.

U.S. Pat. No. 7,043,593 discloses a master unit and a slave unit in a data processor connected via a data bus. The master unit is arranged to assign a priority identifier to a data transaction between the master unit and the slave unit. The slave unit has a data transaction queue into which the data transactions are stored and an execution order analysis unit for determining whether the content of the data transaction queue needs reorganizing based on the priority identifier value of an incoming data transaction. This allows for the out-of-order execution of data transaction by the slave unit. This solution has the drawback that large numbers of data transactions may require reorganizing each time a new data transaction arrives at the slave module. This can inhibit efficient data throughput in case of a high volume of data transaction traffic. Moreover, this solution is not equipped to handle data transactions from multiple masters.

SUMMARY OF THE INVENTION

The present invention seeks to provide an IC arrangement in which an efficient scheduling of service requests for a further module for handling these service requests is facilitated whilst avoiding the need for a large number of network connections.

According to an aspect of the present invention, there is provided integrated circuit arrangement comprising a data communication network comprising a plurality of connections, a plurality of modules coupled to the data communication network via at least one network interface, the network interface comprising a plurality of buffers; at least one remote service module being coupled to the data communication network via a further network interface, wherein each of said modules is arranged to provide its network interface with a service request for the remote service module, said network interface being arranged to extend said service request with a first identifier for establishing a network connection with a remote service module; and a circuit portion comprising a plurality of buffers between the at least one network interface and the remote service module for storing service requests from the plurality of modules, said circuit portion comprising decoding logic for selecting one of said buffers by decoding a further identifier embedded in the service request.

Such a circuit portion, which may be located in the data communication network or in the network interface of the further module, enables the scheduling of service requests in appropriate buffers, e.g. FIFO queues. These buffers may be organized such that service access requests requiring different service handling durations can be separated before placement of the service requests in the buffers, such that reorganization of the buffers is not required. Moreover, in contrast to the IC arrangement disclosed in the paper by Radulescu et al., there is no need for a dedicated connection to each remote queue, thus facilitating a reduction of the number of connections provided by the network.

The further identifier may be a queue identifier such that the decoding logic may directly assign a service request to one of the buffers based on the queue identifier. Alternatively, the further identifier may comprise a priority indication of said service request such that the decoding logic is arranged to select a buffer based on the priority information. In a further alternative, the further identifier comprises an indication for determining the time required by the remote service module to handle said service request such that the decoding logic is arranged to select a buffer based on the duration of the handling of the request by the further module.

In an embodiment, the service request conforms with the OSI (open system interconnect) model, and wherein the decoding logic is arranged to decode the further identifier upon translation of the service request to the transport layer of the OSI model. To this end, the service request may comprise a multi-layer packet comprising a first header layer comprising the first identifier and a further payload layer comprising the further identifier. This has the advantage that the second identifier will be invisible to the network interface of the module sending the service request because this network interface is typically arranged to establish a network connection on the basis of the first header layer in the OSI model.

In a further embodiment, the circuit portion comprises M buffers, M being an integer of at least two, and wherein the modules are arranged to generate M different further identifiers. In other words, a remote buffer is available for each further identifier value such that service requests having different identifier values may be assigned to different remote buffers. This has the advantage that a high flexibility in reordering service requests at the further module is achieved.

In an alternative embodiment, the integrated circuit arrangement comprises N modules, N being an integer of at least two, each of the N modules being arranged to generate M different further routing identifiers, M being an integer of at least two, and wherein the circuit portion comprises M times N buffers, the decoding logic being arranged to select one of the M times N buffers based on a combination of the first identifier and the further identifier. This has the advantage that the service requests may be rescheduled based on both a priority identifier used in the network interface associated with the requesting module as well as the further identifier, such that a fine-grained level of prioritization may be achieved. Alternatively, the circuit portion may comprise M times P buffers, with P being the number of connections in the network, with one of the M time P buffers being selectable on the basis of connection identification information, e.g. a connection identifier, and the further identifier.

Preferably, each connection comprises a buffer between the network interface and the circuit portion. This has the advantage that the assignment of the service requests to one of the circuit portion buffers does not need to be done on the fly, thus avoiding decoding conflicts caused by simultaneously arriving service requests.

The integrated circuit arrangement of the present invention may be a single IC as well as a module comprising multiple ICs interconnected by the data communication network, with the ICs forming the modules (and the further module) of the IC arrangement. In the latter case, the network interfaces may form part of the ICs or may be separate IC in said arrangement. The IC arrangement of the present invention may be incorporated in an electronic device such as a mobile communication device, an image processing device, a signal processing device and so on.

According to a further aspect of the present invention, there is provided a module for use in the integrated circuit arrangement of the present invention, wherein the module is arranged to provide a network interface with a service request for a remote service module, said service request comprising a first identifier for selecting a buffer of the network interface and a second identifier for selecting one of a plurality of buffers in a circuit portion coupled between the network interface and a further network interface of the remote service module. Such a module is capable of generating service requests that may be assigned by the decoder of the circuit portion of the IC arrangement of the present invention to one of its buffers based on the further identifier.

According to yet a further aspect of the present invention there is provided a circuit portion for use in the integrated circuit arrangement of the present invention, the circuit portion comprising a plurality of buffers for coupling between at least one network interface of a plurality of modules for providing service requests and a remote service module for processing said service requests; and decoding logic for storing a service request in one of said buffers by decoding a further identifier embedded in the service request. Such a circuit portion, which may be comprised in a network interface, allows for the efficient handling of service requests by the further module.

BRIEF DESCRIPTION OF THE EMBODIMENTS

Embodiments of the invention are described in more detail and by way of non-limiting examples with reference to the accompanying drawings, wherein FIG. 1 shows an embodiment of an IC arrangement of the present invention;

DETAILED DESCRIPTION OF THE DRAWINGS

Figure 1:
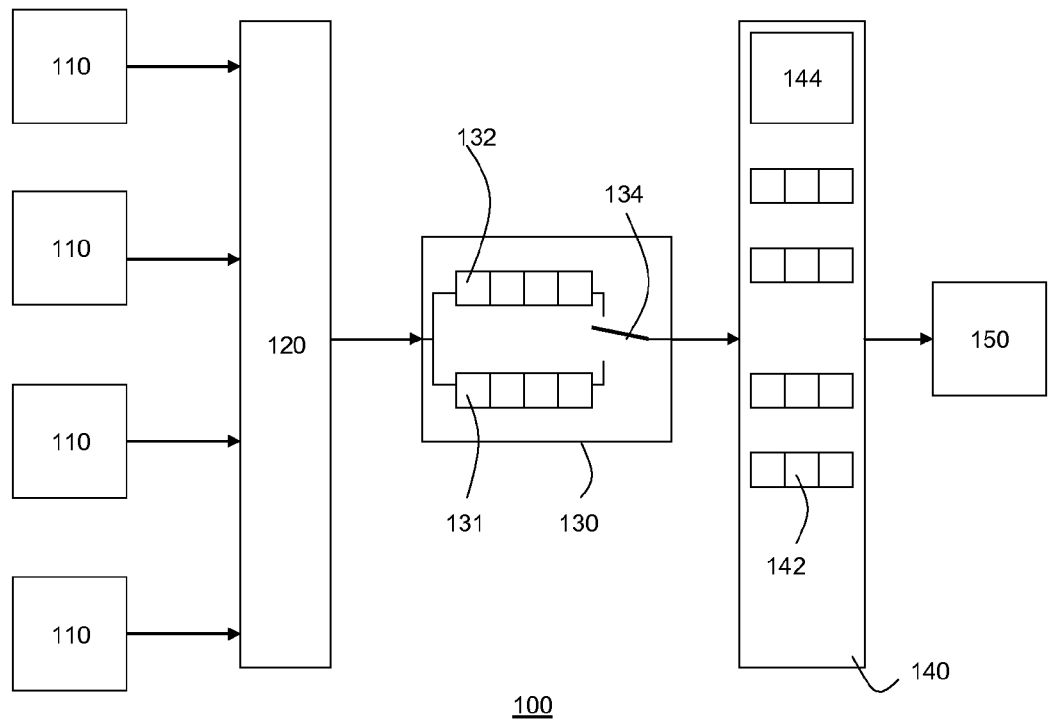

It should be understood that the Figures are merely schematic and are not drawn to scale. It should also be understood that the same reference numerals are used throughout the Figures to indicate the same or similar parts.

FIG. 1 depicts an IC arrangement 100 comprising four master modules 110, which are coupled to a router module 130 symbolized by a pair of buffers 131, 132 and a switch 134 via a network interface 120. It is to be understood that this is a mere symbolic illustration of such a switch module 130 and not intended to limit the scope of this module to this representation; other embodiments of the switch module 130 will be apparent to the skilled person.

The IC arrangement 100 typically comprises at least one slave module 150 coupled to the router module 130 via a further network interface 140. The number of master modules 110 and slave modules 150 is shown by way of non-limiting example only and may comprise any suitable number of modules. In addition, in FIG. 1, the four master modules 110 share a single network interface 120, but it should be understood that other arrangements, e.g. each master module 110 having a dedicated network interface 120 or P master modules 110 sharing Q network interfaces 120, with P and Q integers and P>Q, are equally feasible, as are multiple slave modules 150, which may also be connected to the data communication network through dedicated or shared further network interfaces 140.

The network interface 120 and the further network interface 140 may be considered part of the data communication network including the router module 130. Although a single router module 130 is shown, it will be appreciated that a data communication network may comprise many more router modules 130, e.g. router switches. The router modules 130 may optionally comprise buffers 131, 132, e.g. for buffering best effort communications over the network. The slave module 150 may be a memory controller providing access to a data memory, with the request from a master module 110 comprising a request to access data at a specified memory address. Such requests will be referred to as service requests. Possible implementations of the network interface 120 and the further network interface 140 are well-known to the skilled person; for instance, the paper by Radulescu et al. gives a detailed description of such an implementation, and alternatives will be readily available to the skilled person. Hence, the implementation of these network interfaces will not be described in great detail for reasons of brevity only.

For instance, the network interfaces may be arranged to provide the conversion between a packet-based communication of the data communication network and a higher-level protocol that the modules 110 and 150 use. Such protocols may be defined in accordance with the OSI model, as will be explained in more detail later. The design of the network interfaces 120 and 140 may each be split in two parts; a NI kernel, which implements the channels, packetizes service requests and schedules the requests to the router modules 130, implements the module-to-module flow control and clock domain crossings in case of multiple clock domains and the NI shells, which implement the data communication network connections, transaction ordering for connections, and other higher-level issues specific to the protocol offered to the module.

In an embodiment, the first network interface 120 comprises a plurality of queues (not shown), e.g. FIFO buffers for storing guaranteed bandwidth and best effort service requests from the master modules 110. A scheduler selects which service requests will be forwarded to the data communication network in each data communication cycle as explained in the paper by Radulescu et al.

In accordance with the present invention, the IC arrangement 100 further comprises a circuit portion including a plurality of buffers 142 and decoding logic 144 for assigning a service request arriving from the data communication network, i.e. via the router modules 130, to one of the buffers, i.e. queues, 142. In FIG. 1, the circuit portion is included in the further network interface 140, but it will be explained in more detail later that the circuit portion may be located elsewhere as well.

Figure 2:
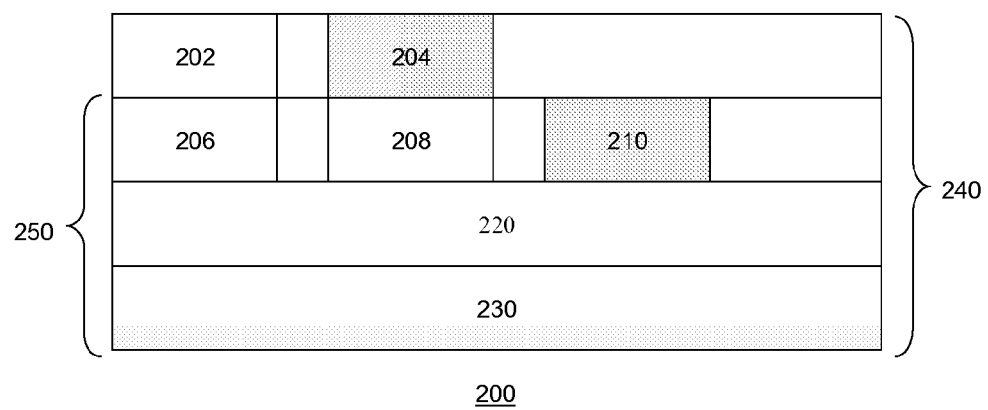
FIG. 2 shows an embodiment of a service request of the present invention.

The decoding logic 144 is arranged to assign a service request to one of the buffers 142 based on a further identifier incorporated in the service request. This is explained in more detail with the aid of FIG. 2, in which a possible embodiment of a service request 200 as generated by a master module 110 (and a network interface 120) is shown. The service request 200 comprises four layers including an upper layer at which a network path 202 and a first level identifier 204 is defined. The four layers may form a network layer message 240 within the OSI model. In an embodiment, an abstract service request is generated by a master module 110, with the network interface 120 arranged to translate the abstract service request into the OSI compliant layered package 200, e.g. by adding the upper layer to the service request 250. The network interface 120 may use service information embedded in the service request from the master module 110, e.g. the name of a remote service, to locate this service on the network and generate the upper layer accordingly. Other alternatives will be readily available to the skilled person. This has the advantage that knowledge of the actual network implementation may be limited to the network interface 120 (and the further network 140 for a return communication).

The network path 202 typically comprises routing information for setting up a connection between the network interface 120 and a further network interface 140, e.g. by placing switches 134 in the correct positions. Such a connection may comprise two unidirectional channels from a master module 110 to a slave module 150 and vice versa. The respective network interfaces 120 and 140 of such a master module 110 and slave module 150 may comprise buffers marking the terminals of such connections, as previously explained. These buffers are for instance shown in the network interfaces in FIG. 3, e.g. buffers 321, 322 in network interface 120 and buffers 341, 342 in further network interface 140. The terminal connection buffers in the further network interface 140 may be identified by a separate first level identifier such as the queue identifier disclosed by Radulescu et al., in which case a connection may be set up by a combination of first-level identifiers, e.g. a combination of a first identifier 204 and a queue identifier. The first identifier 204 may also be present to indicate of the communication of the packetized service request over the data communication network must comply with certain performance requirements, e.g. guaranteed bandwidth or best-effort. The upper layer is typically interpreted by the network interface 120 for setting up the necessary network connection.

For the sake of completeness, it is pointed out that the number of first level identifiers 204 does not have to correspond to the number of slave modules 150 because such modules may be accessible through multiple network connections in which case the number of first identifiers 204 may be larger than the number of slave modules 150. The second layer, which together with lower layers may be part of the transport layer message 250 of a service request 200 in compliance with the OSI model, is typically interpreted when the network layer message 240 is translated to the transport layer message 250, at which stage the upper layer of the service request 200 may be discarded. The transport layer 250 may be interpreted at the service request destination, e.g. the further network interface 140 of the slave module 150. In accordance with an embodiment of a service request 200 of the present invention, the second layer may comprise a service request type 206, a service request length 208 and a further identifier 210, which may be considered a second-level identifier in the context of the OSI model because it is embedded in a lower level of the layered service request 200, is decoded by the decoding logic 144, which assigns the service request 200 to one of the buffers 142 of the further network interface 140 accordingly.

The further identifier 210 may be an identifier for identifying one of the queues 142, or may be some priority identifier, which is interpreted by the decoding logic 144 and subsequently mapped to one of the queues, e.g. buffers 142 of the further network interface 140. Alternatively, the request type 206 may be used as the further identifier because the request type may be mapped to an expected handling time of the service request by the slave module 150.

At this point, it is emphasized that the queues 142 are not the same buffers as the buffers terminating the network connection in the network interface 140, but are separate buffers. Consequently, the second-level identifier 210 is a different identifier than the first-level queue identifier disclosed by Radulescu et al., which is an identifier for setting up a network connection by defining a connection terminal. Instead, the further identifier 210 of the present invention is used to allocate service requests 200 to queues 142 once these service requests 200 have arrived at the circuit portion, such that the further identifier 210 is not used for setting up a network connection.

In an embodiment, the number of buffers 142 in the circuit portion equals the number of potential values of the further identifier 210. Hence, if two master modules 110 generate a service request having the same further identifier 210, these service requests will be assigned to same queue 142, which typically is a FIFO queue such that these service requests cannot be reordered by the load scheduler of the slave module 150. This embodiment provides a good compromise between rescheduling flexibility for the slave module 150 and hardware overhead of the queues 142.

In another embodiment, the number of buffers 142 in the circuit portion equals the number of potential values of the further identifier 210 times the number of master modules 110 in the IC arrangement 100. This allows for the assignment of service requests 200 to a queue 142 based on a combination of the first identifier 204 and the second identifier 210 such that the order in which service requests 200 from different master modules 110 that have the same further identifier 210 arrive at the circuit portion may still be executed by the slave module 150 in a different order because the respective first identifiers 204 of these service requests 200 may cause these service requests 200 to be scheduled to different queues 142. This embodiment provides high rescheduling flexibility in the handling of service requests 200 by the slave module 150.

At this point, it should be understood that the queues 142 preferably are FIFO queues such that internal reordering of these queues is not possible. Hence, the rescheduling takes place at the output of these queues by selection of which queue 142 will be allowed to forward a service request 200 to the slave module 150, e.g. a memory controller.

At this point, it is reiterated that although the paper by Radulescu et al. discloses the use of a queue identifier for selecting a destination queue of a remote network interface, this queue identifier is used in combination with routing information by the network interface of a master module to set up a network connection between the master and a specified slave module. The direct consequence of this implementation is that the number of queue identifiers must equal the number of network connections. This limits the number of values the queue identifier may adopt because the number of connections in the network is typically limited to avoid the IC arrangement 100 comprising a large area dedicated to such connections; since the connections typically comprise one or more buffers, a large number of queue identifiers would lead to the introduction of a large number of buffers in the data communication network. However, since the IC arrangement 100 is much more sensitive to scheduling decisions made in the further network interface 140 than to the performance of the data communication network, there is no need for such a large number of buffers in the network, thus yielding an inefficient solution at least in terms of area overhead. This can only be overcome by limiting the number of buffers 142 in the network interface 140 due to the peer-to-peer nature of the connections between modules.

For this reason, it is beneficial to disconnect the number of buffers available to the further module 150 from the number of connections in the data communication network such that the number of buffers 142 may exceed the number of such connections. This is achieved by the present invention by routing a service request 200 to a port address of a further network interface 140 rather than to a specific queue therein, such that the connection to this port acts as a multiplex connection over which service requests 200 for a plurality of queues 142 in the circuit portion are multiplexed. The present invention has been based on the realization that this does not have a significant detrimental impact on the overall performance of the IC arrangement 100 because this performance is dominated by the time it takes the slave module 150 to handle the service requests 200, as previously explained.

Figure 3:
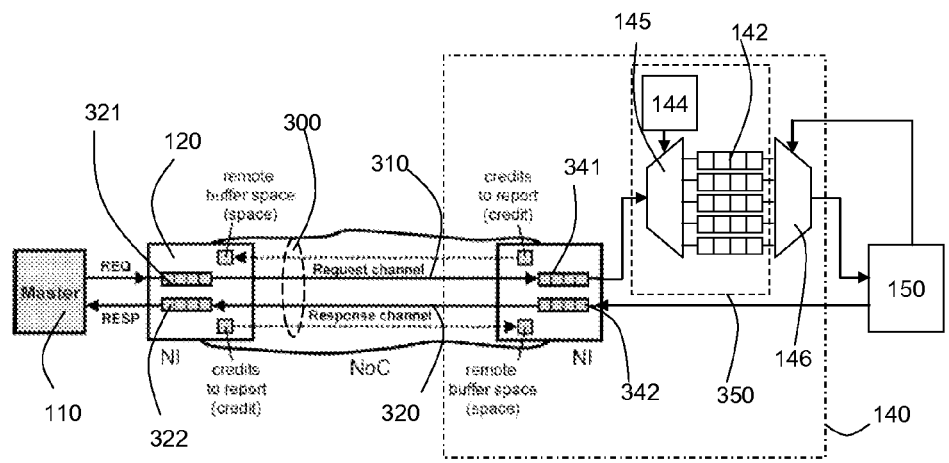
FIG. 3 shows another detail of an embodiment of the IC arrangement of the present invention.

The decoding logic 144 inside the circuit portion is arranged to demultiplex these service requests 200 by translation of the transport layer 250 of each service request and assigning the service request to the appropriate queue 142. This is schematically depicted in FIG. 3, in which a connection 300 is established between the network interface 120 of a master module 100 and the further network interface 140 of a slave module 150. The connection 300 comprises two channels; a first unidirectional request channel 310 from the network interface 120 to the further network interface 140 for communicating the service request 200 from the master module 110 to the slave module 150 and a unidirectional response channel 320 for communicating the requested service, e.g. accessed memory data, from the slave module 150 to the master module 110.

The further network interface 140 comprises two buffers 341 and 342 for buffering communications over the channels over the respective channels 310 and 320, as previously explained. In operation, service requests 200 are sequentially retrieved from the buffer 341 and the transport layer of these requests translated by the decoding logic 144 of the circuit portion 350. The decoding logic 142 controls a demultiplexer 145 for assigning the service request 200 to one of the queues 142 based on the further identifier 210, or the combination of the first identifier 204 and the further identifier 210 as previously explained. In an embodiment, a multiplexer 146 is controlled by the memory controller 150 to retrieve service requests 200 from selected queues 142. This selection may be made using any suitable scheduling algorithm. Such algorithms are known per se and are therefore not explained in detail for reasons of brevity only. Alternative embodiments, in which the multiplexer 146 is controlled in a different manner, are also feasible. For instance, separate control logic (not shown) for controlling the multiplexer 146 may be provided, such that the memory controller 150 receives a single stream of pre-multiplexed requests 200 without having control over the order of the requests 200 in this stream.

Another possibility is that there is a multiplicity of multiplexers 146, each presenting a single stream of requests to the memory controller 150. In a further embodiment, a multiplicity of further network interfaces 140, each comprising a circuit portion 350, with each of the multiplexers 146 of these circuit portions sending a single stream of service requests 200 to the memory controller 150. If multiple streams access the memory controller 150, e.g. via multiple ports, the memory controller 150 may comprise a multiplexer (not shown) with associated control logic (not shown). Other alternatives will be apparent to the skilled person.

Figure 4:
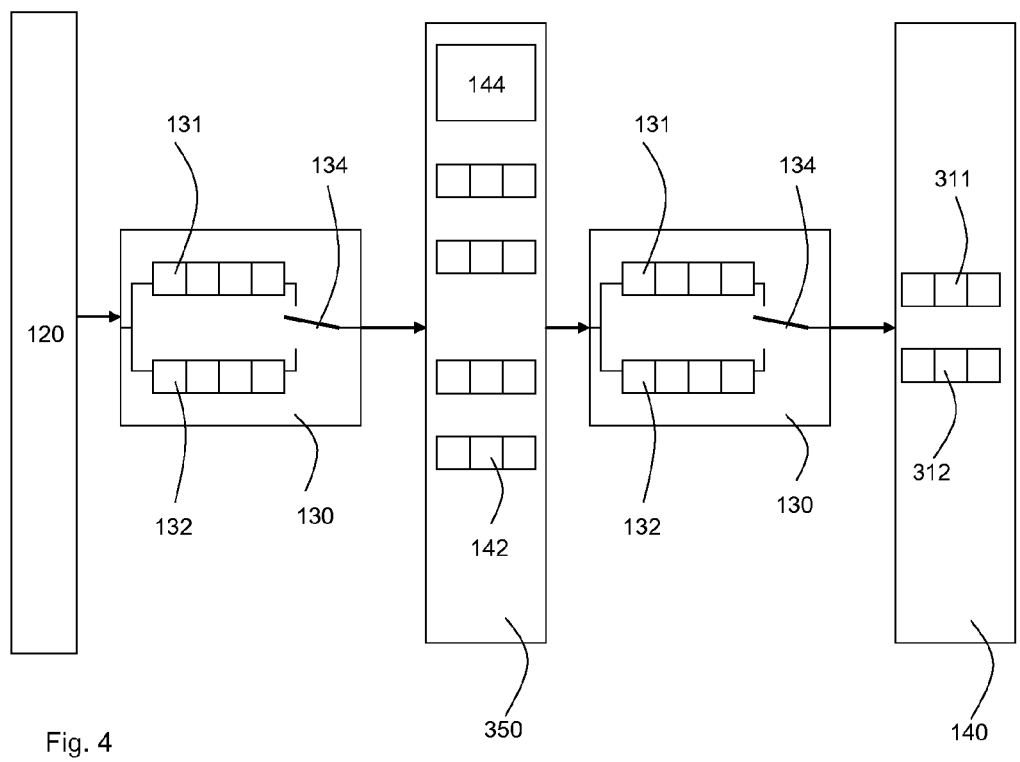
FIG. 4 depicts a detail of another embodiment of an IC arrangement of the present invention.

In FIG. 3, the circuit portion 350 forms a part of the further network interface 140 of the slave module 150 by way of non-limiting example only. It is also feasible for the circuit portion 350 to be located in the data communication network between the network interface 120 and the further network interface 140, i.e. in an intermediate network interface where the transport layer of the service request 250 is interpreted. An example of such an alternative embodiment is shown in FIG. 4. Here, the circuit portion 350 is placed in the data communication network in between two switch modules 130. In this embodiment, the decoding logic 144 further acts as a rescheduling block by rescheduling the order of incoming service requests 200 from the upstream switch module 130 to the downstream switch module 130. In this embodiment, the translation to the transport layer 250 of the service request 200 is performed in the data communication network instead of in the further network interface 140. This may for instance be useful when the buffers 142 cannot be placed in close vicinity of the slave module 150, e.g. for routing reasons, such that they are placed in the data communication network instead, or to facilitate reordering in multiple network interface stages to balance the reordering load over more than one remote network interface. Alternatively, this embodiment may be useful when two streams A and B of service requests 200 get multiplexed over a connection into the circuit portion 350 and get demultiplexed in the circuit portion 350. The circuit portion 350 may detect that one of the streams A and B gets underserved and (temporarily) give preference to requests of 'flow' B in multiplexing A and B over a connection exiting the circuit portion 350. Hence, in general, the present invention may be utilized to balance service request flows at a downstream point in the data communication network.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An integrated circuit comprising:
   a data communication network comprising a plurality of connections;
   a plurality of modules coupled to the data communication network via at least one network interface; and
   at least one remote service module being coupled to the data communication network via a further network interface, the further network interface comprising:
      terminal connection buffers marking the terminals of the plurality of connections, wherein the terminal connection buffers in the further network interface being identified by a first identifier, wherein each of said plurality of modules is arranged to provide its network interface with a service request for the remote service module, said network interface being arranged to extend said service request with the first identifier for establishing a network connection with a remote service module, and
      a circuit portion comprising a plurality of buffers between the at least one network interface and the remote service module for storing service requests from the plurality of modules, said circuit portion comprising decoding logic for selecting one of said buffers by decoding a further identifier embedded in the service request.

2. The integrated circuit of claim 1, wherein the further identifier comprises a priority indication of said service request.

3. The integrated circuit of claim 1, wherein the further identifier comprises an indication for determining the time available to the remote service module to handle said service request.

4. The integrated circuit of claim 1, wherein the service request conforms with the OSI (open system interconnect) model, and wherein the decoding logic is arranged to decode the further identifier upon translation of the service request to the transport layer of the OSI model.

5. The integrated circuit of claim 4, wherein the service request comprises a multi-layer packet comprising a first header layer comprising the first identifier and a further payload layer comprising the further identifier.

6. The integrated circuit of claim 1, wherein the circuit portion comprises M number of buffers, M being an integer of at least two, and wherein the modules are arranged to generate M different further identifiers.

7. The integrated circuit of claim 1, comprising N modules, N being an integer of at least two, each of the N modules being arranged to generate M different further identifiers, M being an integer of at least two, and wherein the circuit portion comprises M times N buffers, the decoding logic being arranged to select one of the M times N buffers based on a combination of the first identifier and the further identifier.

8. The integrated circuit of claim 1, comprising P network connections over which M different further identifiers may be communicated, P and M respectively being integers having a value of at least two, and wherein the circuit portion comprises M times P buffers, the decoding logic being arranged to select one of the M times P buffers based on a combination of connection identification information and the further identifier.

9. The integrated circuit of claim 1, wherein each connection comprises a buffer between the network interface and the circuit portion.

10. An electronic device comprising the integrated circuit, the integrated circuit comprising:
    a data communication network comprising a plurality of connections;
    a plurality of modules coupled to the data communication network via at least one network interface; and
    at least one remote service module coupled to the data communication network via a further network interface, the further network interface comprising:
       terminal connection buffers marking the terminals of the plurality of connections, wherein the terminal connection buffers in the further network interface being identified by a first identifier, wherein each of said plurality of modules is arranged to provide its network interface with a service request for the remote service module, said network interface being arranged to extend said service request with the first identifier for establishing a network connection with a remote service module, and
       a circuit portion comprising a plurality of buffers between the at least one network interface and the remote service module for storing service requests from the plurality of modules, said circuit portion comprising decoding logic for selecting one of said buffers by decoding a further identifier embedded in the service request.

11. The electronic device of claim 10, wherein the plurality of buffers comprises M number of buffers, M being an integer of at least two, M being equal to the number of possible values of the further identifier in a service request.

12. The electronic device of claim 10, wherein the plurality of buffers comprises M times N buffers, M and N being integers of at least two, M being equal to the number of possible values of the further identifier in a service request and N being equal to the number of modules in the plurality of modules in the integrated circuit arrangement;
    the decoding logic being arranged to select one of the M times N buffers based on a combination of a first identifier and the further identifier.

* * * * *